Patented Mar. 3, 1942

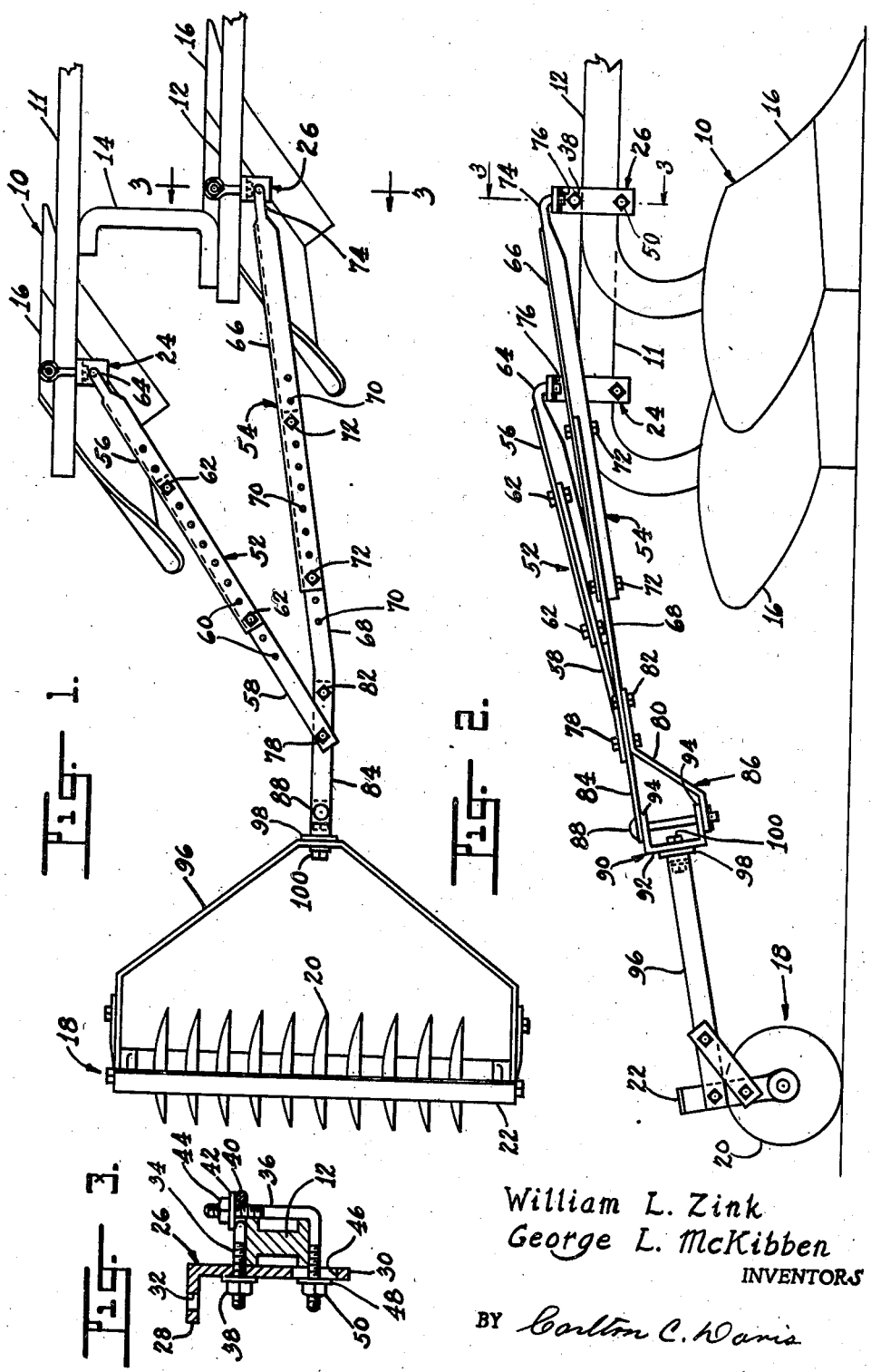

2,274,767

UNITED STATES PATENT OFFICE 2,274,767

ATTACHMENT STRUCTURE

William L. Zink, Plano, and George L. McKibben, Kankakee, Ill., assignors to Sears, Roebuck and Co., Chicago, Ill., a corporation of New York Application February 6, 1939, Serial No. 254,774

11 Claims. (Cl. 280—33.44)

This invention relates generally to attachment structures for farm implements, and has for its principal object the provision of an improved attachment structure whereby an implement, such as a harrow, may be detachably connected to another implement, such as a two-bottom plow, and properly positioned for following the plow and working the ground subsequently to the plowing operation.

Another important object of the present invention is to provide an improved attachment structure for farm implements, having novel means for connecting the attachment structure to the implements.

Another object is to provide an improved attachment structure for farm implements, which is simple in construction, light in weight, effective in operation, and cheaply manufactured.

Other objects and advantages will be apparent from the following description.

In the drawing illustrating a preferred embodiment of the invention:

Figure 1 is a top plan view of an improved attachment structure as used in combination with a two-bottom plow and a rotary harrow;

Figure 2 is a side elevation of the structure shown in Figure 1; and

Figure 3 is a vertical sectional view taken along the line 3—3 of Figures 1 and 2.

In the drawing illustrating a preferred embodiment of the invention, an implement such as a conventional two-bottom plow, referred to generally by the reference character 10, is shown, having a pair of spaced-apart plow beams 11 and 12 which are connected together by a cross beam 14. The plow beams 11 and 12 are adapted for having conventional plowshares 16 connected therewith, the structure for connecting the plowshares 16 to the plow beams 11 and 12 being old in the art and not concerned with the present invention. An implement such as a conventional harrow, referred to generally by the reference character 18, is shown in the drawing for attachment to the plow and comprises essentially a plurality of ground working elements 20 connected together and attached to a frame 22.

The attachment structure to which the present invention relates includes a pair of brackets 24 and 26 attached to the plow beams 11 and 12, respectively. The brackets 24 and 26 are adjustable in order that they may be connected to beams of different cross sections and sizes, and as the brackets 24 and 26, together with the structure for connecting them to the plow beams, are identical, a description of one will suffice for both.

As best shown in Figure 3, the bracket 26 has the general shape of a structural angle for providing a top flange 28 and a side flange portion 30. The top flange portion 28 is provided with an opening 32 therein for receiving a member of the attachment structure and the side portion 30 is preferably disposed in a vertical position in engagement with the outer side of the plow beam 12 shown in cross section in Figure 3. The bracket 26 is connected to the plow beam 12 by a threaded eye bolt 34 and an angle bolt 36 having threaded end portions. The eye bolt 34 is disposed on top of the beam 12 and has the threaded end portion thereof extending through a bolt hole in the side 30 of the bracket 26 and is provided with a nut 38 for retaining the bracket thereon. The angle bolt 36 extends beneath the plow beam 12 and on the opposite side of the plow beam 12 from the side of the bracket 26. The angle bolt 36 has one threaded end portion extending through the eye 40 of the eye bolt 34 and is provided with a washer 42 and a nut 44 thereon for retaining the eye bolt 34 in connection therewith. The other threaded end portion of the angle bolt 36 extends through a slotted opening 46 in the side 30 of the bracket 26 and is likewise provided with a washer 48 and a nut 50 thereon for connecting the lower portion of the bracket to the angle bolt 36.

From the above description it will readily be noted that the brackets 24 and 26 may readily be connected to beams of different widths and heights in cross section and that the lug 28 of the bracket will likewise be disposed the same distance above the top surface of the beam.

As best shown in Figures 1 and 2, a pair of telescopic arms 52 and 54 is provided for being connected to the brackets 24 and 26, respectively. The telescopic arm 52 comprises a fixed section 56 and a relatively adjustable section 58. The sections 56 and 58 are provided with a plurality of equally spaced-apart bolt holes 60 for receiving bolts 62 adapted for connecting sections 56 and 58 together in the desired longitudinal relative positions. The fixed section 56 is preferably formed from a structural angle iron bar and is provided with a formed end portion 64, hook shaped in character, which is receivable in the opening 32 of the bracket 24 which, as stated, is a duplicate of the bracket 26 shown in Figure 3. The telescopic arm 54 is similar to the arm 52 and comprises a fixed section 66 and a relatively adjustable section 68, which are likewise provided with equally spaced apart bolt holes 70 for receiving bolts 72 in order that they may be connected together in the desired longitudinal relationship. The fixed arm 66 is provided with a reduced end portion 74 similar to the end portion 64 of the fixed section 56 and is receivable in the opening 32 of the bracket 26 for attaching the telescopic arm 54 to the bracket.

Retaining elements or cotter pins 76 may be provided for extending through openings in the end portions of the reduced portions 64 and 74 for preventing the arms 52 and 54 from being accidentally disconnected from the brackets 24 and 26, respectively.

The fixed section 66 of the arm 54 is also similar to the section 56 of the arm 52 in that it is preferably formed from structural angle iron stock. The extension sections 58 and 68 are preferably formed from structural bar stock and extend within the angles of the fixed sections 56 and 66, respectively, for being connected therewith. The extension section 58 of the arm 52 has the outer end thereof connected to the extension section 68 of the arm 54 at a point between the outer ends of the fixed section 66 and the extension section 68 by means of a bolt 78.

A depending arm 80 is connected to the extension section 68 of the arm 54 by means of the bolt 78 and a bolt 82. The depending arm 80 and the extended portion 84 of the extension section 68 provide a stirrup or clevis, indicated generally by the reference character 86, and are provided with aligned openings therein for receiving a pivot pin or king-bolt 88. A U-shaped member 90 comprising a web portion 92 and oppositely disposed lugs 94 extends within and is pivotally connected to the clevis 86 by means of the king-bolt 88 which extends through aligned openings in the lugs 94.

A U-shaped draft frame 96 is fixedly connected to the frame 22 of the implement 18 and has the mid-portion thereof fixedly connected to a bearing plate 98 by any suitable means, such as welding. The draft frame 96 is pivotally connected to the U-shaped member 90 by means of a swivel bolt 100 which extends through aligned openings in the mid-portion of the draft frame 96, the bearing plate 98, and the web 92 of the U-shaped member 90.

From the foregoing description it will be noted that the implement 18 may be disposed in the proper position either directly behind or offside to the implement 10 by means of the adjustability of the arms 52 and 54, and that the implement 18 may swing horizontally and vertically, and may adapt itself to the contour of the ground without being hindered or influenced by the position of the implement 10.

This structure also provides for the implement 18 following the implement 10 in the desired position whether the implement 10 is being drawn in a straight line or around a turn.

While the present embodiment of the invention has been illustrated and described as being used for attaching a harrow to a plow, it will, of course, be understood that the attachment structure may readily be used in combination with other implements or vehicles, and that modifications and changes may be made to adapt the structure for use under various conditions without departing from the spirit of the invention or the scope thereof as defined in the appended claims.

We claim:

1. An attachment structure of the character described comprising a bracket having a top portion and a side portion, said side portion being provided with a pair of spaced openings therein for receiving a pair of connecting bolts, one of said openings being slotted and one of said bolts having an eye portion for receiving the other bolt for connecting the bracket to an implement member, said top portion of the bracket having an opening therein, and an arm having a formed end portion receivable in said last named opening for being connected to said bracket.

2. An attachment structure for operatively connecting implement means disposed in tandem relationship, comprising a draft member connected to the leading implement means and swingable up and down on an axis inclined to the direction of travel, an intermediate member connected to the draft member and swingable relative thereto on an axis transverse to the first-mentioned axis and to said direction, and a hitch member connected to the trailing implement means and the intermediate member and oscillatable relatively to the intermediate member on an axis transverse to the other axes.

3. An attachment structure for operatively connecting a pair of transversely and longitudinally spaced leading implements and a trailing implement, comprising a draft member connected to and swingable up and down relative to the leading implements about an axis inclined to the direction of travel, a kingbolt extending through the trailing portion of said draft member, a clevis mounted on the kingbolt, and a swivel element for connecting the trailing implement to the clevis.

4. An attachment structure for operatively connecting a pair of transversely and longitudinally spaced leading implements and a trailing implement, comprising a draft member connected to and swingable up and down relative to the leading implements about an axis inclined to the direction of travel, a kingbolt extending through the trailing portion of said draft member, a clevis mounted on the kingbolt, and a swivel element for connecting the trailing implement to the clevis, said swivel element having the axis thereof positioned transversely to the kingbolt and extending in the line of draft.

5. An attachment structure for operatively connecting a pair of transversely and longitudinally spaced leading implements and a trailing implement comprising a draft member connected to and swingable up and down relative to the leading implements about an axis inclined to the direction of travel said draft member having spaced portions, a kingbolt extending through the spaced portions, a clevis positioned between the spaced portions of the draft member and mounted on the kingbolt, and a swivel element for connecting the trailing implement to the clevis, and swivel element having the axis thereof positioned transversely to the kingbolt and extending in the line of draft.

6. An attachment structure for operatively connecting a pair of transversely and longitudinally spaced leading implements and a trailing implement, comprising a draft member connected to and swingable up and down relative to the leading implements about an axis inclined to the direction of travel, a kingbolt extending through the trailing portion of said draft member, a clevis mounted on the kingbolt and provided with a flat intermediate portion, a hitch member connected to the trailing implement and provided with a flat portion for engagement with the flat portion of the clevis, and a swivel element extending through the flat portions of the hitch member and the clevis for connecting the trailing implement to the clevis.

7. An attachment structure for operatively connecting a pair of transversely and longitudinally spaced leading implements and a trailing implement, comprising a draft member connected to and swingable up and down relative to the leading implements about an axis inclined to the direction of travel, a kingbolt extending through the trailing portion of said draft member, a clevis mounted on the kingbolt and provided with a flat intermediate portion, a hitch member connected to the trailing implement and provided with a flat portion for engagement with the flat portion of the clevis, and a swivel element extending through the flat portions of the hitch member and the clevis for connecting the trailing implement to the clevis, said swivel element having the axis thereof positioned transversely to the kingbolt and extending in the line of draft.

8. An attachment structure for operatively connecting a pair of implements disposed in tandem relationship comprising a draft member connected to the leading implement and swingable up and down, a brace arm connected to the leading implement at a point in laterally and longitudinally spaced relation to the connection between the draft member and the leading implement, said arm being also connected to the draft at a point rearward of the first point, said brace arm being swingable up and down with the draft member, a kingbolt extending through said draft member, a clevis mounted on the kingbolt, and a swivel element for connecting the trailing implement to the clevis, said swivel element having the axis thereof positioned transversely to the kingbolt and extending in the line of draft.

9. An attachment structure of the character described comprising a bracket member provided with a pair of spaced openings therein, and a pair of connecting elements for connecting the bracket member to a beam, said connecting elements extending through the openings in the bracket member on opposite sides of the beam, one of said connecting elements being formed for receiving the other connecting element and adjustably connected therewith.

10. An attachment structure of the character described comprising a bracket member provided with a pair of spaced openings therein, and a pair of bolt members for connecting the bracket member to a beam, said bolt members extending through the openings in the bracket member on opposite sides of the beam, one of said bolt members being provided with an eye portion for receiving the other bolt member and being adjustably connected therewith.

11. An attachment structure of the character described comprising a bracket member provided with a pair of spaced openings therein, at least one of said openings being slotted, and a pair of bolts for connecting the bracket member to a beam, said bolts extending through the openings in the bracket plate on opposite sides of the beam, one of said bolts being provided with an eye portion, and the other of said bolts being formed for receiving the beam and extending through the eye portion for being adjustably connected therewith.

WILLIAM L. ZINK.
GEORGE L. McKIBBEN.